United States Patent [19]

Garcia

[11] Patent Number: 4,638,593
[45] Date of Patent: Jan. 27, 1987

[54] FLOATING FISHING ACCESSORY

[76] Inventor: Robert L. Garcia, 226 Stiles, Houston, Tex. 77011

[21] Appl. No.: 730,555

[22] Filed: May 6, 1985

[51] Int. Cl.⁴ ............................................. A01K 97/00
[52] U.S. Cl. ........................................ 43/54.1; 43/56
[58] Field of Search ........................... 43/56, 55, 54.1; 114/364, 123, 126, 198, 61; 224/920, 921, 922; 119/3

[56] References Cited

U.S. PATENT DOCUMENTS

| | | |
|---|---|---|
| 956,801 | 5/1910 | Eaton .................................... 43/54.1 |
| 986,229 | 3/1911 | Seeger ..................................... 43/56 |
| 1,488,331 | 3/1924 | Ferris ...................................... 43/56 |
| 3,025,629 | 3/1964 | Sears ...................................... 43/55 |
| 3,148,476 | 9/1964 | Ethridge ................................. 43/55 |
| 3,357,127 | 12/1967 | Barradale ................................ 43/55 |
| 3,603,019 | 9/1971 | Smeltzer ............................... 43/54.1 |
| 3,958,289 | 5/1976 | Carlson ................................. 114/364 |
| 4,308,643 | 1/1982 | Montplaisir ............................. 43/55 |

Primary Examiner—Nicholas P. Godici
Assistant Examiner—G. M. Reid
Attorney, Agent, or Firm—Neal J. Mosely

[57] ABSTRACT

A generally boat-shaped fishing accessory comprises an enclosed hull having a live bait compartment and an adjoining insulated compartment for storing food, beverages and other articles. The hinged lid to the insulated compartment comprises a tackle tray with a hinged cover. A pair of longitudinal depending fins provide for stability in the water. A pair of tubular enclosed air chambers extend vertically along the outer stern portion and another pair extend horizontally along the side walls of the hull to keep the device balanced in the water. A pair of tubular rod holders are angularly disposed on each side of the hull to receive and hold fishing rods. Holes are provided for attaching stringers to the floating fishing accessory and for attaching the accessory to the belt loop of the user. The floating fishing accessory allows the user full use of both hands, easy access to live bait and tackle, insulated storage for food, beverages, and other articles, even while the baited hooks are in the water.

10 Claims, 6 Drawing Figures

FLOATING FISHING ACCESSORY

BACKGROUND OF THE INVENTION

1. Field of the Invention

This invention relates generally to fishing containers and rod holders, and more particularly to a floating fishing accessory having a live bait compartment, an insulated compartment for storing food and beverages, a tackle storage compartment, and a pair of rod holders.

2. Brief Description of the Prior Art

A common problem encountered by fishermen particularly in surf or wade fishing is that he must travel a distance from the shore and is limited in the amount of equipment is able to carry on his person. That equipment will generally consist of a floating bait bucket and stringers tied to his belt loop, a net inserted through his trouser waist and into one trouser leg. Miscellaneous articles are carried in his trouser pockets and other tackle may be attached to his head gear. Generally his rod and reel are carried in his hand. Because his hands are nearly constantly occupied, it becomes very awkward to light a cigarette, open a cold drink (if he has one available), or even to bait a hook. He must somehow manage with one hand, find a place to put his rod and reel, or return to shore.

Existing bait buckets are generally small and round or oval in shape. Because of their size and shape, they are difficult to manage with one hand and they bob excessively which tends to batter or stun the live bait. Live shrimp are particularly susceptible to battering. This is undesirable since the movements and liveliness of the bait is one of the reasons that fish are attracted.

Fishing containers, carrying cases, and rod holders are known in the art. There are several patents which disclose various fishing accessories designed to overcome the above mentioned problem.

Majka, U.S. Pat. No. 3,225,983 discloses a combination fishing reel and portable cooler. The device comprises a box-like container molded from insulating material having a removable top cover with an access opening. A transparent removable closure member affords access to the opening without removing the top cover.

Hoyt, U.S. Pat. No. 2,823,971 discloses a fisherman tackle box comprising a box-like container having a hinged top, door, bottom and a plurality of slidably mounted drawers. Harnesses allow the box to be straped to the user.

McGee, U.S. Pat. No. 3,745,692 discloses a hollow circular fishing float provided with sockets into which fishing poles are inserted. The sockets are oriented such that the poles project outwardly and upwardly from the float. The float carries a light for marking its location in darkness. The float allows one to fish a location without being present.

Files, U.S. Pat. No. 3,678,611 discloses a fishing tackle carrier which has a floating cylindrical container with removable caps at the ends and a compartment with a hinged cover containing superimposed trays for lures and tackle. The carrier remains buoyant even though the central compartment is open for access to the trays.

The prior art in general, and these patents in particular does not disclose individually or in combination the present floating fishing accessory having a live bait storage compartment, an insulated compartment for storing food, beverages, and other articles, the lid of which is a hinged tackle box for storing fishing tackle. Tubular rod holders on each side of the hull receive fishing rods allowing the user substantial convenient storage and full use of both hands while the baited hooks are in the water.

SUMMARY OF THE INVENTION

It is therefore an object of the present invention to provide a floating fishing accessory which allows full use of both hands while the baited hook is in the water, easy access to live bait, insulated storage for food and beverages, as well as pocket articles and fishing tackle.

It is another object of this invention is to provide a floating fishing accessory having a live bait compartment which allows water circulation for extending the life and alertness of the live bait carried therein.

Another object of this invention is to provide a floating fishing accessory having a dorsal fin arrangement to provide stability in the water and serve as a base to maintain the accessory in a horizontal position when out of the water.

Another object of this invention is to provide a floating fishing accessory having bouyancy members to balance and stabilize the device in the water.

Another object of this invention is to provide a floating fishing accessory which may be safely tied to the belt loop of the user, eliminating cumbersome and hazardous neck or shoulder straps and allowing the device to float at a convenient height and distance relative to the user.

A further object of this invention is to provide a floating fishing accessory having means for conveniently attaching stringers of caught fish.

A still further object of this invention is to provide a floating fishing accessory which is rugged and durable in use, attractive in appearance, and economical to manufacture.

Other objects of the invention will become apparent from time to time throughout the specification and claims as hereinafter related.

The above noted objects and other objects of the invention are accomplished by a combined floating fishing accessory having a live bait compartment, an insulated compartment for storing food and beverages, a tackle storage compartment, and a pair of rod holders.

DESCRIPTION OF THE PREFERRED EMBODIMENT

Figures 1, 2, 3, 4:
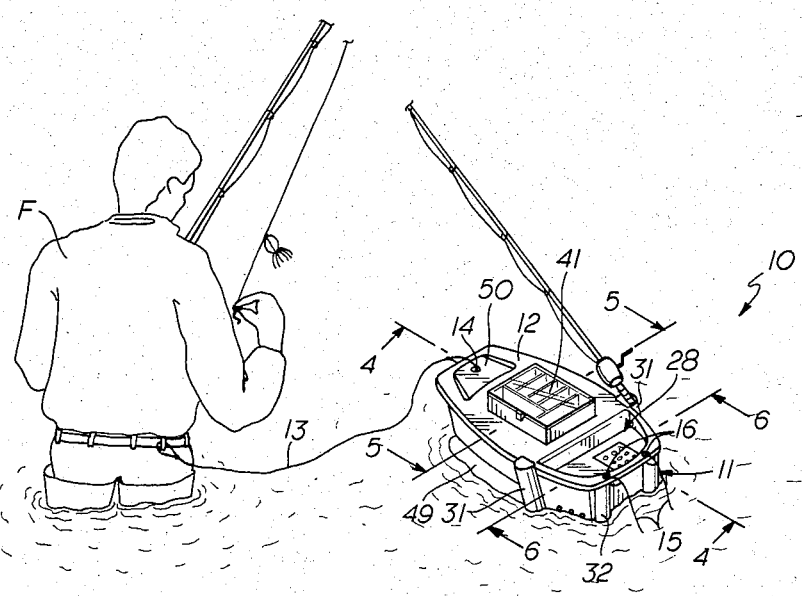
FIG. 1 is a perspective view of the floating fishing accessory in use.
FIG. 2 is a front elevation of the floating fishing accessory in accordance with the present invention showing the bow stabilizing fin and bouyancy tube arrangement.
FIG. 3 is a rear elevation of the floating fishing accessory in accordance with the present invention showing the rear or stern bouyancy tube arrangement.
FIG. 4 is a longitudinal cross section taken along line 4—4 of FIG. 1 showing the two compartments.
Figure 5:
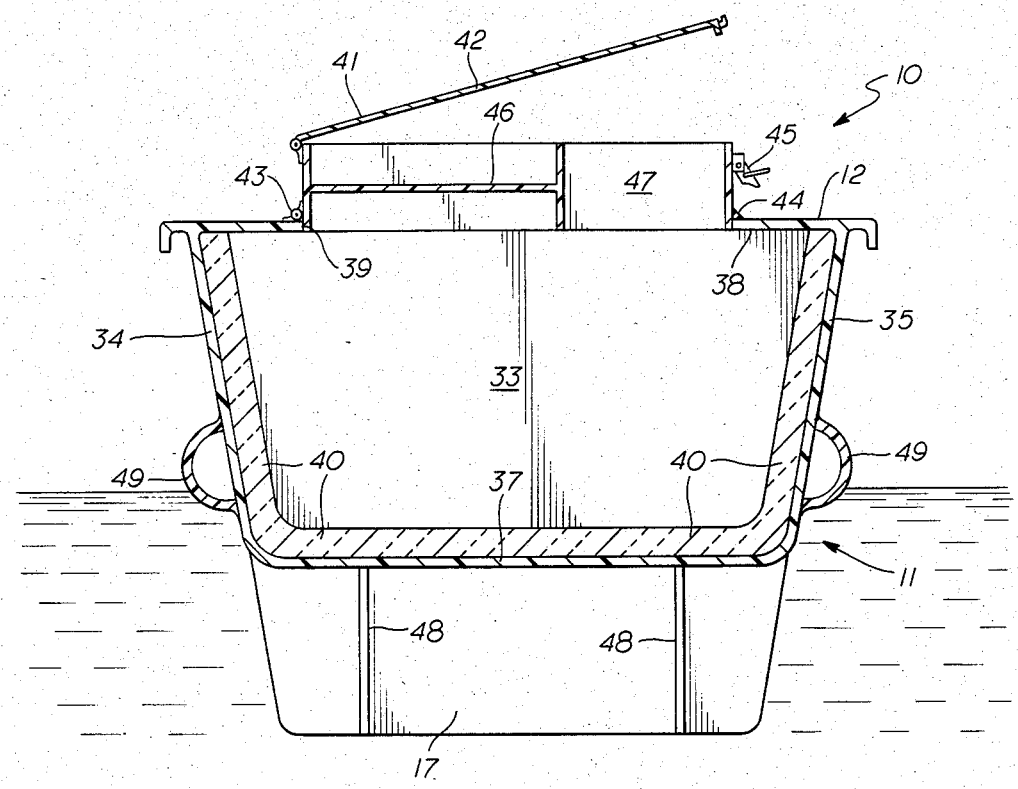
FIG. 5 is a transverse cross section taken along line 5—5 of FIG. 1 showing the insulated compartment with the lid to the tackle tray open.
Figure 6:
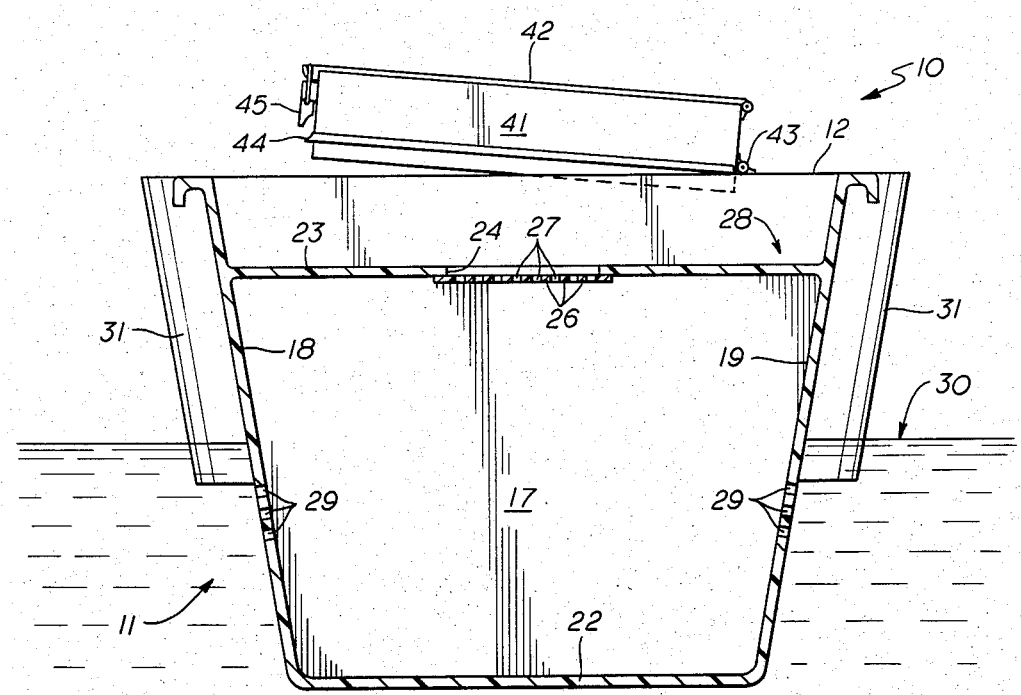
FIG. 6 is a transverse cross section taken along line 6—6 of FIG. 1 showing the live bait compartment and the entire tackle box pivotally raised.

Referring to the drawings by numerals of reference, there is shown in FIG. 1, a preferred floating fishing accessory 10 being used by a wade fisherman F. The floating fishing accessory 10 comprises a generally boat-shaped hull 11 of molded plastic, enclosed by a generally flat rectangular top portion or deck 12 also of molded plastic. The fishing accessory 10 may be tied to the belt loop of the user by a length of cord 13 attached through a hole 14 in the deck 12 near the front or bow of the hull 11 to float at any convenient proximity to the user. Stringers 15 may be attached through holes 16 in the deck 12 near the rear or stern of the hull for storing the caught fish.

Referring now to FIGS. 1 through 6, the hull 11 of the floating fishing accessory 10 is divided into two separate chambers or compartments. The chamber at the rear or stern comprises a live bait compartment 17 having side walls 18 and 19, front and rear walls 20 and 21, and a bottom wall 22. The deck portion 12 of the hull 11 is recessed over the area of the bait compartment 17 to form a top wall 23 having a rectangular opening 24 therein.

A flat perforated plate closure member which is larger than the opening 24 is pivotally attached to the underside of the top wall 23 by a spring hinge 25 to form a bait access door 26. The spring hinge 25 maintains the door 26 biased closed against the opening 24. Access to the bait compartment 17 is gained by pushing downwardly on the door 26 with the hand and the door quickly closes after the hand is removed. The perforations 27 in the door 26 allow fresh air to enter the bait compartment 17 which prolongs the life of the live bait. The bait access door 26 may be formed of transparent plastic for better visibility and to aid in quickly spotting and catching the live bait.

The recessed area of the deck 12 surrounding the top wall 23 above the compartment 17 forms a sunken region 28 which may be used to temporarily place articles. The sunken region 28 will also direct water from the top portion 12 back into the bait compartment 17 through the door perforations 27. A series of perforations 29 in each side wall 18 and 19 near the mean water line 30 permit the accessory 10 to bob with wave action and permits water to enter and exit the compartment for constant circulation within the compartment. This constant circulation aids in prolonging the life of the bait.

A pair of hollow tubular rod holders 31 extend vertically and angularly along each side of the hull 11 adjacent the perforations 29 to removably receive and hold the handles of fishing rods. The rod holders 31 are inclined rearwardly relative to the bait compartment so that the accessory remains balanced and the fishing lines do not become entangled when rods are held by the holders. The rod holders allow the user full use of both hands while the baited hooks are in the water.

A pair of hollow tubular enclosed air chambers, or bouyancy tubes 32 extend vertically along the outer corners of the bait compartment 17 substantially their entire length. The bouyancy tubes 32 maintain the stern end of the apparatus afloat and keeps the device balanced in the water.

An elongated chamber or compartment 33 cojoins the bait compartment 17 at the front wall 20 and extends therefrom to complete the adjoining bow portion of the hull 11. The elongated compartment 33 has side walls 34 and 35, front wall 36, bottom wall 37, and shares the common wall 20 of the bait compartment 17. The deck portion 12 of the hull 11 extends over the open area of the elongated compartment 33 to form a top wall 38 having a rectangular opening 39 therein. The interior surfaces of the walls are lined with a thermal insulating material 40, such as expanded polystyrene beads. The elongated insulated compartment 33 is to be used for storing food, beverages, and other articles.

The rectangular opening 39 in the top portion 38 of the insulated compartment 33 removably receives a close fitting tackle box 41 with a hinged lid 42. The tackle box 41 is connected to the top wall 38 along one side by a hinge 43. A seal member 44 extends around the lower perimeter of the tackle box 41 to serve as a stop means when the tackle box is received in the opening 39 and as a water resistant barrier around the opening under normal weather conditions. The tackle box 41 includes a latch 45 and an integral tray portion 46 and an adjacent open area 47. The tray portion 46 is used for storing fishing tackle and other small articles, and the open area 47 provides access to the insulated compartment 33 by lifting the hinged lid 42.

Greater access to the insulated compartment is also gained by lifting one side of the tackle box 41 to pivot the entire tackle box out of the opening 39. This feature aids in placing large articles or food and beverages in the compartment, as well as filling or emptying the compartment of ice. The tackle box serves serves as a tackle box, double hinged to allow accessibility to the tackle itself, and to allow accessibility to the larger compartment below which is in effect, the hull of the device.

The elongated insulated compartment 33 is approximately two-thirds the depth of the bait compartment. A pair of parallel, laterally spaced stabilizing fins 48 depend vertically from the bottom wall 37 of the elongated compartment 33 to the bottom wall 22 of the bait compartment 17 and extend longitudinally substantially the length of the elongated compartment. The fins 48 aid in stabilizing the accessory in the water, and provide a base for supporting the accessory in a horizontal position when out of the water.

A pair of hollow tubular enclosed air chambers, or bouyancy tubes 49 extend horizontally along the outer bottom edges of the elongated compartment 33 substantially the length of the compartment. The bouyancy tubes 49 maintain the bow end of the apparatus afloat even when filled and keeps the device balanced in the water.

The deck portion 12 of the hull extends outwardly over the front wall 36 of the elongated compartment 33 and is provided with a small depressed area 50 which extends transversely across the deck portion 12. The depressed area 50 also serves as a small shelf for storing small articles.

OPERATION

To use the fishing assessory, the fisherman raises the tackle box and loads the insulated compartment with the desired food and beverages and may add ice. If a dry refrigerant is used, or the ice is eliminated, the compartment may be used as dry storage for extra reels, clothing, or other articles. The seal of the tackle box maintains the insulated compartment substantially watertight under normal conditions.

The tackle box is loaded with a variety of lures, lines, tools, etc., two rods and reels may be placed in the rod holders, and the bait compartment is loaded with live bait.

When the desired gear is loaded in the accessory, it is carried into the water until it floats, and may then be attached to the belt loop of the user to float at a distance convenient to the user.

The rod or rods can be baited and inserted into the holder at any convenient time, and will thus free the fisherman for the length of time he wants, while lighting a cigarette, smoking, drinking, or eating while not loosing an opportunity for a bite.

The device allows full use of both hands, easy access to live bait, insulated storage for food and beverages, as well as pocket articles and fishing tackle.

While this invention has been described fully and completely with special emphasis upon a preferred embodiment, it should be understood that within the scope of the appended claims the invention may be practiced otherwise than as specifically described herein.

I claim:

1. A floating fishing accessory comprising
   a unitary generally enclosed bouyant hull having front and rear walls, spaced side walls, and top and bottom walls defining a storage space therein,
   said storage space divided into a first compartment for receiving and containing live bait and a second adjoining compartment for storing various articles,
   said first compartment having an apertured closure member pivotally mounted in said top wall providing access thereto and a plurality of apertures through said hull positioned at the general location of the surface of the water in the floating position whereby both fresh water and air circulate therethrough as said hull moves in the water due to wave action for maintaining the bait in a live condition for an extended period of time,
   said second compartment provided with a closure member pivotally mounted in said top wall providing access thereto and an interior lining of thermally insulating material suitable for selectively storing articles in a thermally insulated condition or other articles in a relatively dry condition,
   at least one generally rectangular fin depending from said bottom wall of said hull and extending longitudinally a distance therealong for stabilizing said hull in a balanced position in the water and supporting said accessory in a horizontal position out of the water on a ground surface,
   bouyancy means on said hull for maintaining said hull in a balanced floating position in the water when loaded with heavy articles,
   tubular rod holding means on the exterior of said hull adapted to receive and hold fishing rods, and
   attaching means on said hull for releasably attaching said accessory to the user to float at a convenient distance therefrom.

2. A fishing accessory according to claim 1 in which said closure for said first compartment comprises a flat rectangular plate spring hinged in said top wall and urged thereagainst in the closed position.

3. A fishing accessory according to claim 2 in which said flat rectangular plate is of transparent material for observation of said live bait.

4. A fishing accessory according to claim 1 in which said closure for said second compartment comprises a box-like container pivotally mounted in said top wall and provided with a water resistant seal about its juncture therewith,
   said container having a hinged lid including a latch for latching the lid in the closed position and a tray disposed therein having a series of storage pockets,
   said container positioned to reside partially above said top wall in the closed position and allowing access to said second compartment in a pivoted open position, and
   said tray having an opening therethrough providing access to said second compartment when said hinged lid is in the open position.

5. A fishing accessory according to claim 1 including
   at least one aperture through said top wall of said hull for releasably attaching stringers of caught fish thereto.

6. A fishing accessory according to claim 1 in which said bouyancy means comprises
   a pair of tubular enclosed air chambers extending generally vertically along the exterior corners of the rear wall.

7. A fishing accessory according to claim 1 in which said bouyancy means comprises
   a pair of tubular enclosed air chambers extending generally horizontally along the exterior of said side walls of said hull a distance above said bottom wall approximate the location of the surface of the water in the floating position.

8. A fishing accessory according to claim 1 in which said bouyancy means comprises
   a pair of tubular enclosed air chambers extending generally vertically along the exterior corners of the rear wall, and
   a pair of tubular enclosed air chambers extending generally horizontally along the exterior of said side walls of said hull a distance above said bottom wall approximate the location of the surface of the water in the floating position.

9. A floating fishing accessory comprising
   a unitary generally enclosed bouyant hull having front and rear walls, spaced side walls, and top and bottom walls defining a storage space therein,
   said storage space divided into a first compartment for receiving and containing live bait and a second adjoining compartment for storing various articles,
   said first compartment having an apertured transparent closure member spring hinged in said top wall providing access thereto and a plurality of apertures through said hull positioned at the general location of the surface of the water in the floating position whereby both fresh water and air circulate therethrough as said hull moves in the water due to wave action for maintaining the bait in a live condition for an extended period of time,
   said second compartment provided with a boxlike closure member pivotally mounted in said top wall providing access thereto and an interior lining of thermally insulating material suitable for selectively storing articles in a thermally insulated condition or other articles in a relatively dry condition, said closure member provided with a water resistant seal about its juncture with said top wall,
   at least one generally rectangular fin depending from said bottom wall of said hull and extending longitudinally a distance therealong for stabilizing said hull in a balanced position in the water and supporting said accessory in a horizontal position out of the water on a ground surface,
   a pair of tubular enclosed air chambers extending generally vertically along the exterior corners of the rear wall and a pair of tubular enclosed air chambers extending generally horizontally along the exterior of said side walls of said hull a distance above said bottom wall approximate the location of the surface of the water in the floating position for maintaining said hull in a balanced floating position in the water when loaded with heavy articles, tubular rod holding means on the exterior of said hull adapted to receive and hold fishing rods, at least one aperture on said hull for releasably attaching said accessory to the user to float at a convenient distance therefrom, and at least one aperture through said top wall of said hull for releasably attaching stringers of caught fish thereto.

10. A fishing accessory according to claim 9 in which said container having a hinged lid including a latch for latching the lid in the closed position and a tray disposed therein having a series of storage pockets, said container positioned to reside partially above said top wall in the closed position and allowing access to said second compartment in a pivoted open position, and said tray having an opening therethrough providing access to said second compartment when said hinged lid is in the open position.

* * * * *